(12) United States Patent
Lambert

(10) Patent No.: US 9,876,862 B1
(45) Date of Patent: Jan. 23, 2018

(54) SERVICE IDENTIFICATION WITH REDUCED AMBIGUITY

(71) Applicant: MARVELL INTERNATIONAL LTD., Hamilton (BM)

(72) Inventor: Paul A. Lambert, Mountain View, CA (US)

(73) Assignee: Marvell International Ltd., Hamilton (BM)

( * ) Notice: Subject to any disclaimer, the term of this patent is extended or adjusted under 35 U.S.C. 154(b) by 369 days.

(21) Appl. No.: 14/184,255

(22) Filed: Feb. 19, 2014

Related U.S. Application Data

(60) Provisional application No. 61/766,419, filed on Feb. 19, 2013.

(51) Int. Cl.
*G06F 15/16* (2006.01)
*H04L 29/08* (2006.01)
*H04L 29/06* (2006.01)

(52) U.S. Cl.
CPC ............ *H04L 67/16* (2013.01); *H04L 67/104* (2013.01); *H04L 69/24* (2013.01)

(58) Field of Classification Search
CPC ....... H04L 67/10; H04L 67/104; H04L 69/24; H04W 4/00
USPC ................. 709/202–205, 227–229, 217–219
See application file for complete search history.

(56) References Cited

U.S. PATENT DOCUMENTS

| | | | | |
|---|---|---|---|---|
| 8,446,917 | B2 * | 5/2013 | Park | H04L 67/20 370/466 |
| 8,738,925 | B1 * | 5/2014 | Park | H04L 12/189 713/186 |
| 9,002,352 | B2 * | 4/2015 | Abraham | H04W 48/16 455/434 |
| 2004/0167974 | A1 * | 8/2004 | Bunn | G06F 3/1204 709/223 |
| 2008/0159304 | A1 * | 7/2008 | Ozugur | H04L 12/2832 370/401 |
| 2009/0217043 | A1 * | 8/2009 | Metke | G06F 21/445 713/171 |
| 2009/0327391 | A1 * | 12/2009 | Park | H04L 67/104 709/201 |
| 2010/0042839 | A1 * | 2/2010 | Ho | H04L 9/3226 713/169 |

(Continued)

OTHER PUBLICATIONS

"Wi-Fi Display Technical Specification Version 1.0.0", Wi-Fi Alliance® Technical Committee, Wi-Fi Display Technical Task Group, Aug. 24, 2012, 149 pages.

(Continued)

*Primary Examiner* — Bharat N Barot

(57) ABSTRACT

A method of performing service discovery is implemented in a first communication device. In the method, a service discovery request is generated that contains a first identifier associated with a requested service and does not contain a second identifier associated with the requested service. The first communication device is caused to transmit the service discovery request. A service discovery response, received by the first communication device from a second communication device, is processed. The service discovery response contains the second identifier and does not contain the first identifier. At least the second identifier is utilized to determine that the second communication device provides the requested service.

20 Claims, 8 Drawing Sheets

(56) References Cited

U.S. PATENT DOCUMENTS

| | | | | |
|---|---|---|---|---|
| 2011/0051733 | A1* | 3/2011 | Hirata | H04L 49/10 370/400 |
| 2011/0126122 | A1* | 5/2011 | Forman | G06F 17/30867 715/745 |
| 2011/0131625 | A1* | 6/2011 | Schlack | H04N 21/25808 725/116 |
| 2011/0137916 | A1* | 6/2011 | Deen | G06F 17/3002 707/747 |
| 2011/0145421 | A1* | 6/2011 | Yao | H04W 76/023 709/228 |
| 2011/0149806 | A1* | 6/2011 | Verma | H04L 12/2809 370/255 |
| 2011/0280229 | A1* | 11/2011 | Montemurro | H04W 48/08 370/338 |
| 2012/0191780 | A1* | 7/2012 | Sato | H04W 76/02 709/204 |
| 2013/0159195 | A1* | 6/2013 | Kirillin | G06Q 20/322 705/71 |
| 2013/0231108 | A1* | 9/2013 | Kim | H04W 48/16 455/434 |
| 2014/0006579 | A1* | 1/2014 | Pitsch | H04L 67/02 709/223 |
| 2015/0117430 | A1* | 4/2015 | Zhuang | H04L 67/16 370/338 |
| 2016/0057237 | A1* | 2/2016 | Yang | H04L 67/16 709/224 |
| 2016/0073334 | A1* | 3/2016 | Goto | H04L 67/16 370/254 |
| 2017/0251424 | A1* | 8/2017 | Cordeiro | H04L 67/16 |

OTHER PUBLICATIONS

IEEE P1905.1™-2013, IEEE Draft Standard for a Convergent Digital Home Network for Heterogeneous Technologies, The Institute of Electrical and Electronics Engineers, Inc., (Mar. 6, 2013).

IEEE P1905.1™/D09, P1905.1$^{TM}$/D09 Draft Standard for a Convergent Digital Home Network for Heterogeneous Technologies, The Institute of Electrical and Electronics Engineers, Inc., (Dec. 13, 2012).

IEEE Std 802.11$^{TM}$ 2012 (Revision of IEEE Std 802.11-2007) IEEE Standard for Information technology—Telecommunications and information exchange between systems—Local and metropolitan area networks—Specific requirements Part 11: Wireless LAN Medium Access Control (MAC) and Physical Layer (PHY) specifications, The Institute of Electrical and Electronics Engineers, Inc., pp. 1-2695 (Mar. 29, 2012).

IEEE Std 802.11ac/D5.0 "Draft STANDARD for Information Technology—Telecommunications and information exchange between systems—Local and metropolitan area networks—Specific requirements, Part 11: Wireless LAN Medium Access Control (MAC) and Physical Layer (PHY) specifications: Amendment 4: Enhancements for Very High Throughput for Operation in Bands below 6 GHz," The Institute of Electrical and Electronics Engineers, Inc., pp. 1-440 (Jan. 2013).

IEEE Std 802.11ac/D6.0 "Draft STANDARD for Information Technology—Telecommunications and information exchange between systems—Local and metropolitan area networks—Specific requirements, Part 11: Wireless LAN Medium Access Control (MAC) and Physical Layer (PHY) specifications: Amendment 4: Enhancements for Very High Throughput for Operation in Bands below 6 GHz," The Institute of Electrical and Electronics Engineers, Inc., pp. 1-446 (Jul. 2013).

IEEE Std 802.11ac/D7.0 "Draft STANDARD for Information Technology—Telecommunications and information exchange between systems—Local and metropolitan area networks—Specific requirements, Part 11: Wireless LAN Medium Access Control (MAC) and Physical Layer (PHY) specifications: Amendment 4: Enhancements for Very High Throughput for Operation in Bands below 6 GHz," The Institute of Electrical and Electronics Engineers, Inc., pp. 1-456 (Sep. 2013).

IEEE Std 802.11adz$^{TM}$/D9.0 "Draft Standard for Information technology—Telecommunications and information Exchange Between Systems—Local and Metropolitan Area Networks—Specific Requirements" Part 11: Wireless LAN Medium Access Control (MAC) and Physical Layer (PHY) Specifications, Amendment 3: Enhancements for Very High Throughput in the 60 GHz Band *The Institute of Electrical and Electronics Engineers, Inc.*, pp. 1-679 (Jul. 2012).

IEEE P802.11s™/D2.0 "Draft STANDARD for Information Technology—Telecommunications and information exchange between systems—Local and metropolitan area networks—Specific requirements—Part 11: Wireless LAN Medium Access Control (MAC) and Physical Layer (PHY) specifications—Amendment <number>: Mesh Networking," *The Institute of Electrical and Electronics Engineers, Inc.* (2008).

IEEE Std 802.15.4™-2011 (Revision of IEEE Std 802.15.4-2006) "IEEE Standard for Local and metropolitan area networks—Part 15.4: Low-Rate Wireless Personal Area Networks (LR-WPANs)," *The Institute of Electrical and Electronics Engineers, Inc.* pp. 1-314 (Sep. 5, 2011).

Harada, "Project: IEEE P802.15 Working Group for Wireless Personal Area Network (WPANs)," IEEE 802.15-07-0693-003c, slides 24-33 (May 2007).

Hiertz et al., "The IEEE 802.11 Universe," IEEE Communications Magazine, pp. 62-70, (Jan. 2010).

Perahia et al., "Gigabit Wireless LANs: an overview of IEEE 802.11ac and 80211ad," ACM SIGMOBILE Mobile Computing and Communications Review, vol. 15, No. 3, pp. 23-33 (Jul. 2011).

Specification of the Bluetooth System, Version 2.0: vol. 0, "Master Table of Contents & Compliance Requirements," pp. 1-74; vol. 1, "Architecture & Terminology Overview," pp. 1-92; vol. 2, "Core System Package [Controller Volume]", pp. 1-814; vol. 4, "Core System Package [Host Volume]," pp. 1-250, (Nov. 4, 2004).

"Wi-Fi Peer-to-Peer (P2P) Technical Specification, Version 1.00", Wi-Fi Alliance, pp. 1-135, Dec. 1, 2009.

* cited by examiner

SERVICE IDENTIFICATION WITH REDUCED AMBIGUITY

CROSS-REFERENCE TO RELATED APPLICATION

This claims the benefit of U.S. Provisional Patent Application No. 61/766,419, entitled "Service Identification Disambiguation" and filed on Feb. 19, 2013, the disclosure of which is hereby incorporated herein by reference.

FIELD OF THE DISCLOSURE

The present disclosure relates generally to communication networks and, more particularly, to service discovery within communication networks.

BACKGROUND

In some wireless communication networks, procedures are provided that allow a first device to discover services provided by one or more other devices connected to the network. For example, various Layer 3 service discovery protocols may be used by devices connected to 802.11-based WiFi networks. In some systems, a first device broadcasts a request for a particular service (e.g., a printing, music, gaming, or other service), and devices on the network that hear the request (and support the requested service) send a response indicating that the service is available. Some service discovery protocols, such as those provided by Bonjour or Digital Living Network Alliance (DNLA), use lengthy string identifiers to identify services. Transmitting an entire string identifier, however, can substantially increase the overhead in service discovery request and response messages, which may be particularly undesirable for low-power devices. Conversely, the use of shorter service identifiers (e.g., by using a hash of a string identifier) can lead to ambiguity. In particular, shorter identifiers increase the probability of a "collision" in which two or more services are represented by the same identifying information.

SUMMARY

In an embodiment, a method of performing service discovery is implemented in a first communication device. The method comprises generating, in the first communication device, a service discovery request that (i) contains a first identifier associated with a requested service and (ii) does not contain a second identifier associated with the requested service, causing the first communication device to transmit the service discovery request, and processing, at the first communication device, a service discovery response received by the first communication device from a second communication device. The service discovery response (i) contains the second identifier and (ii) does not contain the first identifier. The method also comprises utilizing at least the second identifier to determine that the second communication device provides the requested service.

In another embodiment, a non-transitory, tangible, computer-readable memory stores instructions that, when executed by one or more processors in a first communication device, cause the one or more processors to generate a service discovery request that (i) contains a first identifier associated with a requested service and (ii) does not contain a second identifier associated with the requested service, cause the first communication device to transmit the service discovery request, and process a service discovery response received by the first communication device from a second communication device. The service discovery response (i) contains the second identifier and (ii) does not contain the first identifier. The instructions also cause the one or more processors to utilize at least the second identifier to determine that the second communication device provides the requested service.

In another embodiment, a method of performing service discovery is implemented in a first communication device. The method comprises processing, at the first communication device, a service discovery request received by the first communication device from a second communication device. The service discovery request (i) contains a first identifier associated with a requested service and (ii) does not contain a second identifier associated with the requested service. The method also comprises, after processing the service discovery request, generating, at the first communication device, a service discovery response that (i) contains the second identifier and (ii) does not contain the first identifier, and causing the first communication device to transmit the service discovery response.

In another embodiment, a non-transitory, tangible, computer-readable memory stores instructions that, when executed by one or more processors in a first communication device, cause the one or more processors to process, at the first communication device, a service discovery request received by the first communication device from a second communication device. The service discovery request (i) contains a first identifier associated with a requested service and (ii) does not contain a second identifier associated with the requested service. The instructions also cause the one or more processors to, after the one or more processors process the service discovery request, generate a service discovery response that (i) contains the second identifier and (ii) does not contain the first identifier, and to cause the first communication device to transmit the service discovery response.

DETAILED DESCRIPTION

Figure 1:
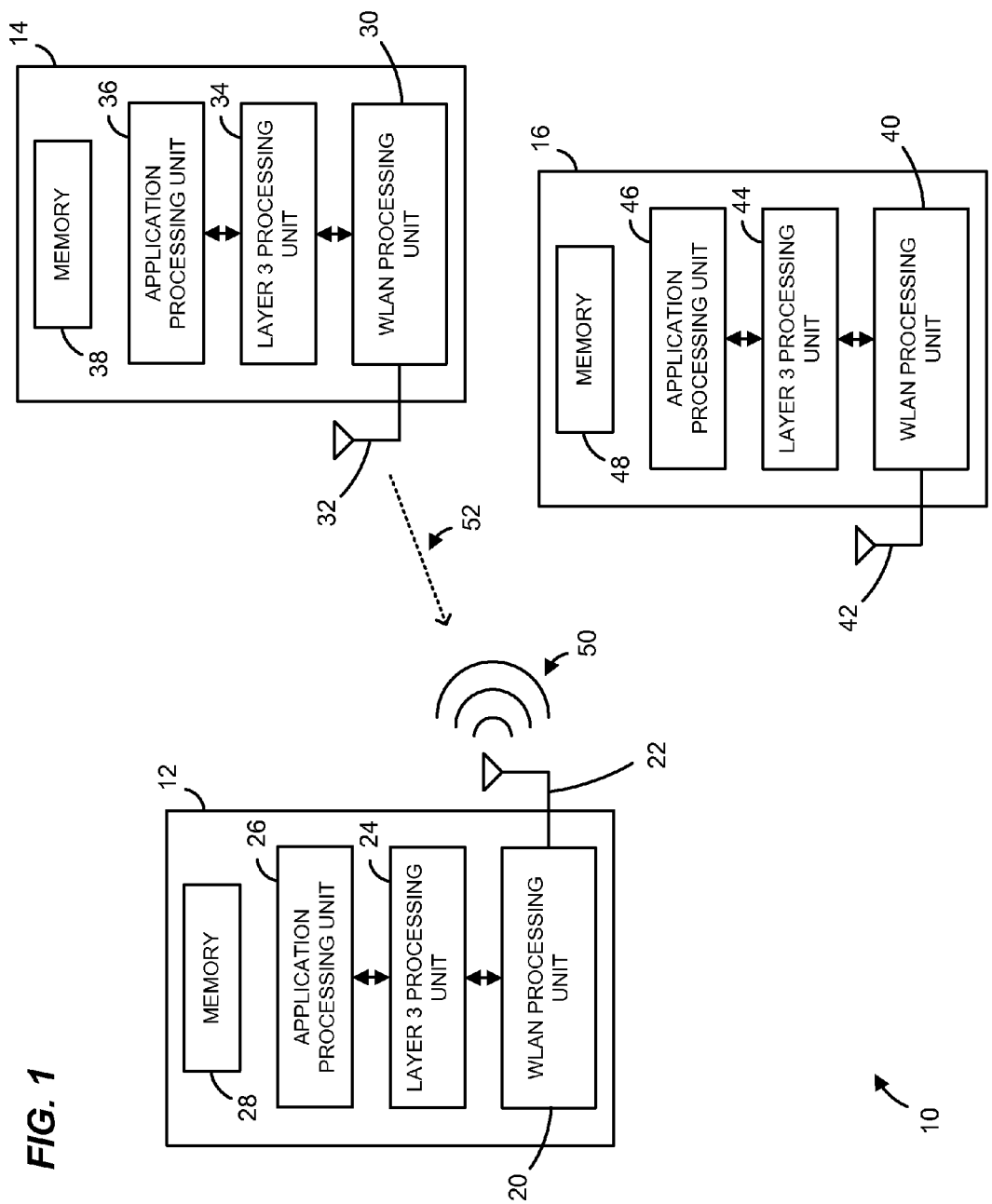
FIG. 1 is a block diagram of an example wireless communication network in which service discovery techniques are implemented, according to an embodiment.

In conventional service discovery protocols and systems, a first device sends a service discovery request that includes an identifier of a desired service, and a second device receiving the request sends a service discovery response that includes the same service identifier to indicate that the service is available/supported. In general terms, for example, a first device may send a request containing service identifier "A" to indicate that a particular service is desired, and in response receive, from a second device, a response containing service identifier "A" as an indication that the second device supports that service. In example embodiments described below, however, the probability of a collision is reduced by using different service identifier information in the service discovery response as compared to the service discovery request. In general terms, for example, a first device sends a request containing service identifier "A" to indicate that a particular service is desired, and then receives, from a second device, a response containing service identifier "B" as an indication that the second device supports that service, in an embodiment. Using this approach, in some embodiments, the effective length of the service identifier is increased, without necessarily increasing the overhead (e.g., number of bits) in the request, and without necessarily increasing the overhead in the response. In some embodiments and/or scenarios where "A" and "B" have the same length (e.g., number of bits, number of octets, etc.), for example, this approach doubles the effective length of the service identifier, which in turn exponentially decreases the probability of a collision.

In some of these embodiments, a conventional hashing technique, such as a "secure hash algorithm" (e.g., SHA-1 or SHA-256) is first used to generate a hash of a relatively long service identifier (e.g., a hash of a Bonjour or DNLA string identifier). In these embodiments, a "collision" may be viewed as the event of two different service identifiers (e.g., two different string identifiers) resulting in the same hash, with the probability of a collision generally decreasing as the size of the hash increases. Generally, a 128-bit or greater hash results in only a negligible probability of generating the same hash for two different string identifiers. In order to further reduce the amount of overhead associated with service identification information, however, the service discovery request in some embodiments uses only a first portion of the hash as a service identifier, and the service discovery response uses only a different, second portion of the hash as a service identifier. In one embodiment where SHA-256 is used to generate a 256-bit (32-octet) hash of a string identifier, for example, the service discovery request uses only six octets of the hash as an identifier of a desired service, and the service discovery response (from a device supporting the desired service) uses only a different six octets of the same hash as an identifier of the desired service. As compared to using the same six octets in both the request and the response, this approach decreases the collision probability by approximately $10^7$, in some embodiments.

In other embodiments described below, other service discovery techniques are instead (or additionally) used. In one embodiment, for example, ambiguity is reduced by utilizing an identifier of a service (e.g., a hash-based service identifier) in conjunction with additional service-related information contained in a service discovery message (e.g., request or response). In other embodiments, a single device utilizes multiple service identifiers to reduce ambiguity. In one embodiment, for example, a device sends a first service identifier to specify a particular service, and sends a second service identifier to specify the same service if the first service identifier resulted in a collision.

FIG. 1 is a block diagram of an example wireless communication network 10 in which service discovery techniques are implemented, according to an embodiment. FIG. 1 shows an embodiment and scenario in which the example network 10 includes a first device 12, a second device 14, and a third device 16. In the example embodiment of FIG. 1, the network 10 is a WiFi network (e.g., IEEE 802.11a, 802.11n, 802.11ac, 802.11ad, etc.), and each of the devices 12, 14, 16 is a WiFi-enabled device, such as a WiFi-enabled smartphone, tablet, laptop computer, desktop computer, wireless printer, etc. In other embodiments, however, the network 10 is a different, suitable type of wireless communication network, and each of the devices 12, 14, 16 is configured to communicate according to that (non-WiFi) network.

In the embodiment of FIG. 1, the first device 12 includes a wireless local area network (WLAN) processing unit 20 coupled to one or more antennas 22, a Layer 3 processing unit 24 coupled to the WLAN processing unit 20, an application processing unit 26 coupled to the Layer 3 processing unit 24, and a memory 28. The WLAN processing unit 20 is configured to perform at least Layer 2 WiFi operations (e.g., Layer 2 functions supporting device discovery, connection and set-up), in an embodiment. In some embodiments, the WLAN processing unit 20 is configured to implement peer-to-peer (P2P) and/or tunneled direct link setup (TDLS) functions. In an embodiment, the WLAN processing unit 20 also supports Layer 1 (physical layer) functions for transmitting and receiving wireless signals via the antenna(s) 22. In some embodiments, the WLAN processing unit 20 is a physical/tangible processor, or a group of physical/tangible processors. In different embodiments, for example, the WLAN processing unit 20 includes one or more hardware processors, such as one or more processors on one or more integrated circuits (e.g., application-specific integrated circuits (ASICs), programmable logic devices, etc.), and/or includes one or more processors (e.g., a central processing unit (CPU) or a dedicated processor) that is/are configured to read and execute software or firmware instructions stored in memory 28 or another memory not shown in FIG. 1.

In an embodiment, the Layer 3 processing unit 24 is configured to perform Layer 3 service discovery operations, such as generating and/or processing service discovery requests and/or service discovery responses, for example. These operations are discussed in more detail below, according to various embodiments. The Layer 3 processing unit 24 is a physical/tangible processor, or a group of physical/tangible processors, according to various embodiments. In various different embodiments, for example, the Layer 3 processing unit 24 includes one or more hardware processors, such as one or more processors on one or more integrated circuits (e.g., ASICs, programmable logic devices, etc.), and/or includes one or more processors that are configured to read and execute software or firmware instructions stored in memory 28 (e.g., a CPU or a dedicated processor).

In an embodiment, the application processing unit 26 is configured to execute applications that can utilize one or more services provided by other devices connected to network 10 (e.g., the second device 14 and/or the third device 16). In various embodiments, for example, the application processing unit 26 executes an application that generates content (e.g., a word processing application) that can be printed by another device on network 10, an application that provides content (e.g., music, photographs, video, etc.) that can be played or displayed by another device on network 10, an application that determines or displays location information based on location data provided by other devices on network 10, a gaming application that can accept inputs from (and/or provide outputs to) gaming services/applications of other devices on network 10, etc. In some embodiments, the application processing unit 26 is also configured to execute applications that provide one or more services that may be utilized by other devices on network 10 (e.g., the second device 14 and/or the third device 16), such as printing services, media display services, gaming services, etc. The application processing unit 26 is a physical/tangible processor, or a group of physical/tangible processors, according to various embodiments. In one embodiment, for example, the application processing unit 26 includes one or more processors that are configured to read and execute software or firmware instructions stored in memory 28 (e.g., a CPU or a dedicated processor).

While FIG. 1 shows the WLAN processing unit 20, the Layer 3 processing unit 24, and the application processing unit 26 as separate processing units, it is understood that, in some embodiments, a single physical/tangible processor implements the functionality of the WLAN processing unit 20, the Layer 3 processing unit 24, and/or the application processing unit 26, or that the functionality of the WLAN processing unit 20, the Layer 3 processing unit 24, and/or the application processing unit 26 is distributed across the same group of physical/tangible processors.

In an embodiment, the memory 28 is a non-transitory, tangible, computer-readable memory that includes one or more volatile and/or nonvolatile memories, such as a random access memory (RAM) and/or a read-only memory (ROM), for example. As noted above, the memory 28 in some embodiments stores instructions that are executed by the application processing unit 26, the Layer 3 processing unit 24, and/or the WLAN processing unit 20. Additionally (or alternatively), in some embodiments, the memory 28 stores one or more tables that associate service identifiers with particular services. Such tables are discussed in further detail below, according to various embodiments.

The second device 14 includes a WLAN processing unit 30 coupled to one or more antennas 32, a Layer 3 processing unit 34 coupled to the WLAN processing unit 30, an application processing unit 36 coupled to the Layer 3 processing unit 34, and a memory 38. The WLAN processing unit 30 is configured to perform at least Layer 2 WiFi operations, in an embodiment. In an embodiment, the WLAN processing unit 30 is similar to the WLAN processing unit 20 of the first device 12.

In an embodiment, the Layer 3 processing unit 34 is configured to perform at least Layer 3 service discovery operations, such as generating and/or processing service discovery requests and/or service discovery responses, for example. These operations are discussed in more detail below, according to various embodiments. In an embodiment, the Layer 3 processing unit 34 is similar to the Layer 3 processing unit 24 of the first device 12.

In an embodiment, the application processing unit 36 is configured to execute applications that provide one or more services that may be utilized by other devices on network 10 (e.g., the first device 12 and/or the third device 16), such as printing services, playing or displaying media, providing media content, gaming services, etc. In particular, in the scenario reflected in FIG. 1, the application processing unit 36 of the second device 14 is configured to execute one or more applications providing services, with at least one of those services being a service that can be utilized by at least one application executed by application processing unit 26 of the first device 12. As just one example, in an embodiment in which the first device 12 is a smartphone or personal computer and the second device 14 is an audio/video receiver for a television, the application processing unit 26 of the first device 12 executes an application for selecting video or images from a library, and the application processing unit 36 of the second device 14 executes an application for displaying video or images on the television. In some embodiments, the application processing unit 36 is also configured to execute one or more applications that can utilize services provided by other devices on network 10 (e.g., the first device 12 and/or the third device 16). In an embodiment, the application processing unit 36 is similar to the application processing unit 26 of the first device 12.

In an embodiment, the memory 38 is a non-transitory, tangible, computer-readable memory that includes one or more volatile and/or nonvolatile memories, such as RAM and/or ROM, for example. The memory 38 in some embodiments stores instructions that are executed by the application processing unit 36, the Layer 3 processing unit 34, and/or the WLAN processing unit 30. Additionally (or alternatively), in some embodiments, the memory 38 stores tables that associate service identifiers with particular services, as discussed in further detail below.

The third device 16 includes a WLAN processing unit 40 coupled to one or more antennas 42, a Layer 3 processing unit 44 coupled to the WLAN processing unit 40, an application processing unit 46 coupled to the Layer 3 processing unit 44, and a memory 48. In an embodiment, the WLAN processing unit 40, Layer 3 processing unit 44, application processing unit 46, and/or memory 48 is/are similar to the WLAN processing unit 30, Layer 3 processing unit 34, application processing unit 36, and/or memory 38, respectively, of the second device 14.

Figure 2A:
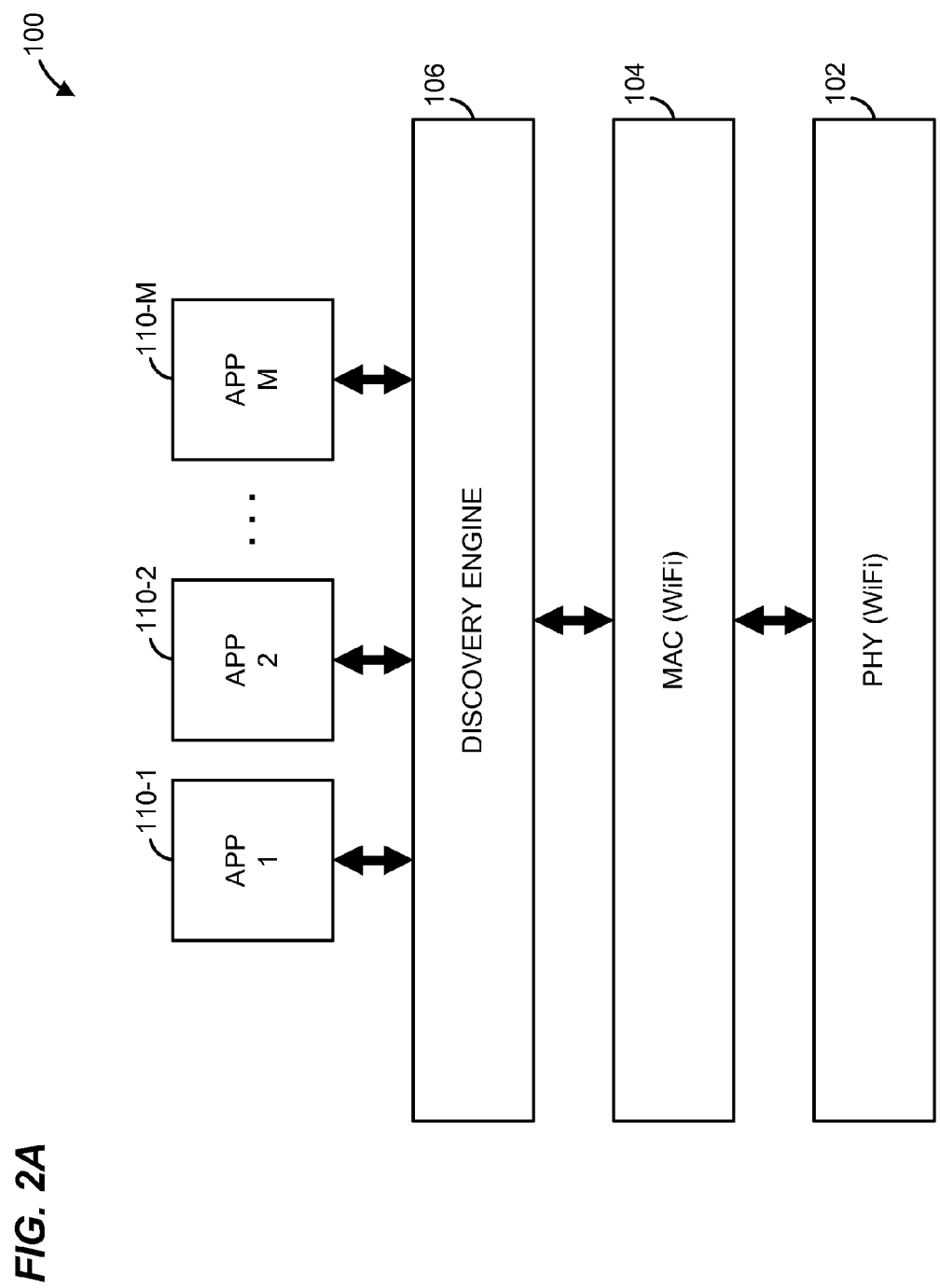
FIG. 2A is a diagram of an example stack executed by a first device in the wireless communication network of FIG. 1, according to an embodiment.

To facilitate the discussion of service discovery operations within network 10, stack-level operation of the devices of FIG. 1 will now be briefly discussed. FIG. 2A shows an example stack 100 that is implemented in the first device 12 of FIG. 1, according to an embodiment. The stack 100 includes a physical layer (PHY) 102, a media access control (MAC) layer 104, a discovery engine 106, and, at an application layer, M applications 110-1 through 110-M. While FIG. 2A shows at least M=3 applications, in other embodiments M is any integer greater than or equal to one. In an embodiment, the PHY 102 and MAC layer 104 are implemented by WLAN processing unit 20 of the first device 12, the discovery engine 106 is implemented by Layer 3 processing unit 24 of the first device 12, and the applications 110-1 through 110-M are implemented by application processing unit 26 of the first device 12. In an embodiment, each of applications 110-1 through 110-M is an application that can utilize services (e.g., printing services, media content services, gaming services, etc.) provided by a different device.

Figure 2B:
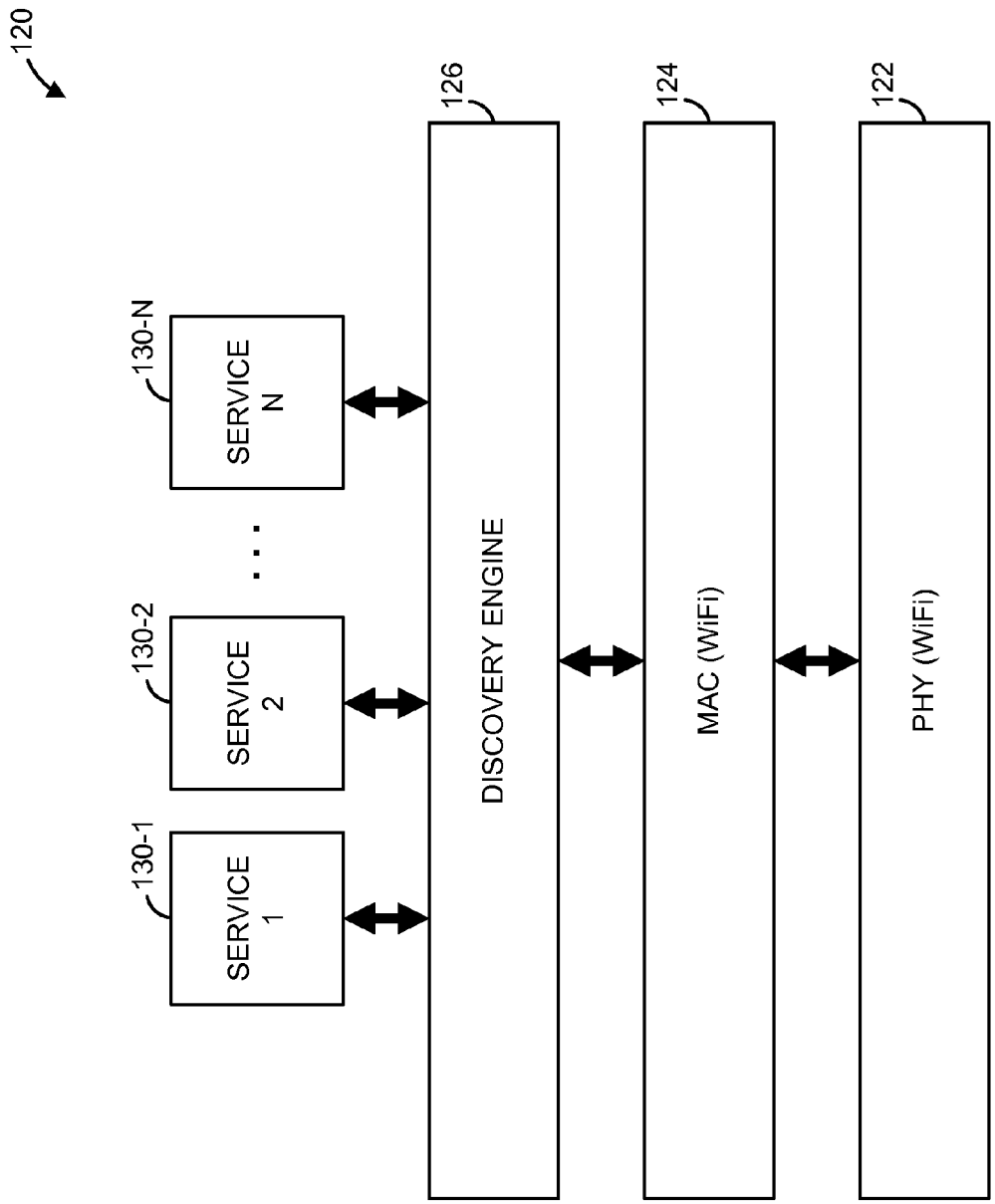
FIG. 2B is a diagram of an example stack executed by a second device in the wireless communication network of FIG. 1, according to an embodiment.

FIG. 2B shows an example stack 120 that is implemented in the second device 14 of FIG. 1, according to an embodiment. The stack 120 includes a PHY 122, a MAC layer 124, a discovery engine 126, and, at an application layer, N services 130-1 through 130-N. While FIG. 2 shows at least N=3 services, in other embodiments N is any integer greater than or equal to one. In an embodiment, the PHY 122 and MAC layer 124 are implemented by WLAN processing unit 30 of the second device 14, the discovery engine 126 is implemented by Layer 3 processing unit 34 of the second device 14, and the services 130-1 through 130-N are implemented by application processing unit 36 of the second device 14. In an embodiment, a stack similar to stack 120 is implemented in the third device 16 of FIG. 1, but with a different set of one or more services instead of services 130-1 through 130-N.

While stack 100 of FIG. 2A includes applications (i.e., applications 110-1 through 110-M) that have only been described as utilizing services provided by other devices, and stack 120 of FIG. 2B has only been described as including services (i.e., services 130-1 through 130-N), it is understood that, in some embodiments, at least one of applications 110-1 through 110-M can provide one or more services to other devices, and/or at least one of services 130-1 through 130-N is additionally, or alternatively, an application that can utilize services provided by other devices. In one embodiment where devices 12 and 14 are both smartphones, for example, application 101-1 of the first device 12 and service 130-1 of the second device 14 are identical "swapping" applications for automatically exchanging contact information (e.g., names, email addresses, etc.) between smartphones, with either application being capable of both requesting a service (e.g., querying whether another device is executing the swapping application and therefore able to provide contact information) and responding to a service request (e.g., answering such a request affirmatively).

Service discovery procedures in network 10 are now described with reference to FIGS. 1, 2A and 2B, according to one embodiment and scenario. In this embodiment/scenario, application 110-1 executing on the first device 12 determines that a particular service is desired. In one embodiment and scenario in which application 110-1 is a word processing application, for example, application 110-1 detects that a user of the first device 12 has input a "print" command via a user interface of the first device 12, and therefore determines that a printing service is needed. In another example embodiment and scenario, application 110-1 is an application that populates a list of nearby printers that will then be available for future use.

Application 110-1 then informs the discovery engine 106 that the printing service is desired. In an embodiment, application 110-1 specifies the desired printing service as a string identifier. In some embodiments, the string identifier is one that only generally indicates that a printing service, or a particular type of printing service, is desired. In other embodiments, the string identifier corresponds to a specific desired printing service (e.g., a printing service already known to be provided by the second device 14).

In some embodiments, the discovery engine 106 selects a shorter service identifier, corresponding to the string identifier, to be included in a service discovery request. In one embodiment, the shorter service identifier is a first portion of a hash, where the hash is generated from the string identifier using any suitable hashing technique (e.g., SHA-1, SHA-256, etc.). According to various embodiments, the hash is mapped to the first hash portion using any suitable technique. In one embodiment, for example, the first hash portion is simply the first n octets of the hash. In other embodiments, a more complex algorithm is used to determine how the hash is mapped to the first hash portion. In one embodiment, the hash is generated, and the first hash portion is extracted (or otherwise generated from the hash), at an earlier time, with the first hash portion and information associating the first hash portion with the desired service being stored in a memory (e.g., a table in memory 28).

After the first hash portion is retrieved, in an embodiment, the first device 12 broadcasts a service discovery request 50 that includes the first hash portion in a service identifier field, and the service discovery request 50 is received and processed by devices 14 and 16. In the second device 14, the discovery engine 126 filters the service identifier field to determine whether the service identifier matches any service known to the second device 14. In one embodiment and scenario, discovery engine 126 utilizes a table stored in a memory (e.g., memory 38) to determine that the first hash portion in the service identifier field is associated with a service supported by the second device 14 (e.g., the service 130-1). In one such embodiment, the table also associates a second portion of the hash with the same service, and the discovery engine 126 generates a service discovery response 52 that includes the second hash portion in a service identifier field. In an embodiment, the service discovery response 52 does not include the first hash portion that was included in the service discovery request 50, and the service discovery request 50 does not include the second hash portion that is later included in the service discovery response 52.

The second device 14 then transmits the service discovery response 52 to the first device 12, where the discovery engine 106 filters the service identifier field to determine whether the second hash portion is associated with the desired service. In one embodiment, the discovery engine 106 makes this determination by utilizing the same table that was accessed earlier to retrieve the first hash portion for inclusion in the service discovery request 50. Thereafter, if the second hash portion is indeed associated with the desired service, the discovery engine 106 informs the application 110-1 that the desired service is available from the second device 14, and application 110-1 responds in an appropriate manner (e.g., indicating to a user of the first device 12 that the service is available, or establishing a connection with the second device 14 in order to make use of the service, etc.).

In one embodiment and scenario, a discovery engine of the third device 16 (e.g., similar to discovery engine 126 of the second device 14) processes the service discovery request 50 in a similar manner, but determines that the first hash portion is not associated with any services provided by the third device 16. Accordingly, in an embodiment, the third device 16 does not send a service discovery response to the first device 12.

By using different service identifiers (e.g., different hash portions) in the request 50 and response 52, in an embodiment, the effective total length of the hash portion is increased, thereby greatly decreasing the risk of collision without necessarily increasing the length of the service identifier in the request or the length of the service identifier in the response. In some embodiments, other advantages also result from the use of different request/response identifiers for the same service. For example, in an embodiment, different request/response service identifiers provide greater security by de-correlating the service identifiers in the request and the response. For example, an unauthorized observer of communications between the first device 12 and the second device 14 may be unable to ascertain that response 52 was sent in response to request 50 due to the use of different service identifiers. Moreover, in an embodiment, different request/response service identifiers provide the ability to discriminate between the request and the response. In one embodiment and scenario, for example, the second device 14 is able to recognize that request 50 is a service discovery request based on the particular value of the service identifier included therein, and the first device 12 is able to recognize that response 52 is a service discovery response based on the particular value of the (different) service identifier included therein. An unauthorized observer, however, may be unable to determine that request 50 is a service discovery request, and/or that response 52 is a service discovery response.

Figure 3:
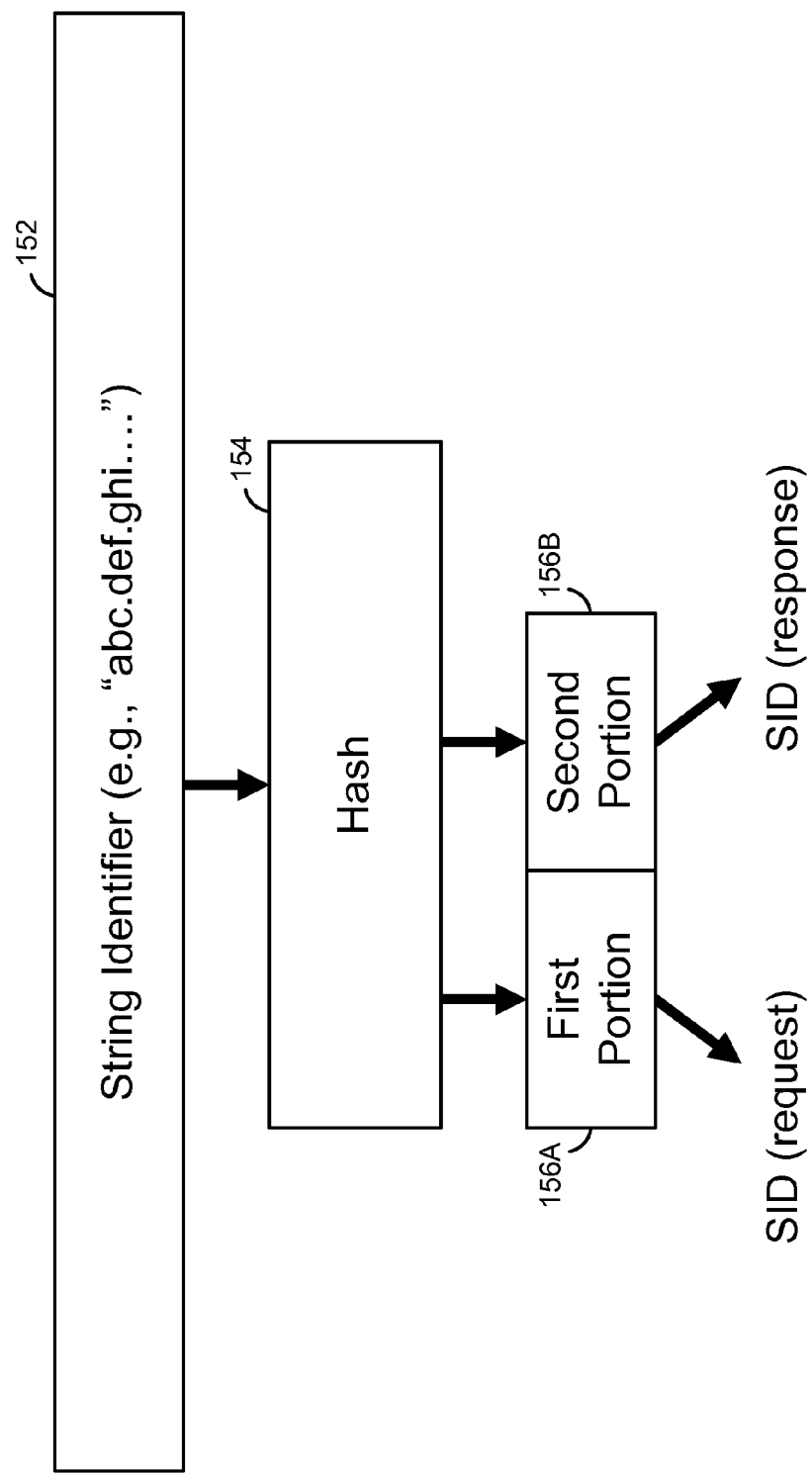
FIG. 3 is a diagram of an example process for converting a string identifier to a first service identifier and a second service identifier, for use in a service discovery request and a service discovery response, respectively, according to an embodiment.

FIG. 3 is a diagram of an example process 150 illustrating the service identification technique just described, according to one embodiment. As seen in FIG. 3, a string identifier 152 associated with the desired service is converted to a hash 154. In various embodiments, the hash 154 is generated using SHA-1, SHA-256, or any other suitable hashing technique.

The hash 154 is then mapped to a first hash portion 156A and a second hash portion 156B using any suitable technique. In one embodiment, for example, the first hash portion is a first n octets of the hash 154, and the second hash portion 156B is a second n octets of the hash 154. In various embodiments, the first hash portion 156A and second hash portion 156B combine to have a same length as the hash 154, or combine to have a length shorter than the hash 154. In one embodiment, the hash 154 is 16 octets long, while the first hash portion 156A and second hash portion 156B are each six octets long. As described above, in an embodiment, the first hash portion 156A and the second hash portion 156B are stored in tables in memories of the various devices (e.g., memory 28 and memory 38), along with information associating the hash portions 156A, 156B with a particular service. These tables can then be accessed by the respective discovery engines when generating a service discovery request or service discovery response, in an embodiment.

In an alternative embodiment, the string identifier 152 is instead a different (non-string), suitable type of identifier. In another embodiment, hash 154 is a universally unique identifier (UUID), or a portion thereof. In still other embodiments, the hash 154 is not generated at all, and the first portion 156A and second portion 156B are instead mapped directly from the string (or non-string) identifier 152.

In some embodiments, other techniques are instead, or additionally, used to reduce service identification ambiguity. In some embodiments, for example, a defined registration process is used to mitigate the probability of a collision. In one such embodiment, an information element (e.g., one bit) is used to indicate whether a service identifier included in a service discovery request and/or response is an identifier that was assigned from a controlled identifier space according to a defined registration process. In an embodiment, any service identifier assigned according to the defined registration process is guaranteed to be different from any other service identifier assigned according to the same registration process. In some embodiments and/or scenarios, at least some service identifiers that were not assigned to the defined registration process are randomly assigned. In various embodiments, for example, instance identifiers, secure identifications, and/or applications/services that lack centralized registration are assigned random service identifiers.

Additionally or alternatively, in some embodiments, ambiguity is reduced by using not only the service identifier, but also additional information relating to the desired service. In one such embodiment, a service discovery message (e.g., request 50 and/or response 52 of FIG. 1) includes, in addition to a service identifier field, additional information that can be used to uniquely (in a global or local sense) identify the service specified in the service identifier field. In one embodiment, for example, a service discovery message includes a service identifier field containing a hash-based service identifier (e.g., similar to the first hash portion 156A or second hash portion 156B of FIG. 3), as well as additional service information. A discovery engine processing the service discovery message (e.g., discovery engine 126 or 136) filters on not only the service identifier, in an embodiment, but also filters on at least a portion of one or more fields containing the additional service information, in order to determine the corresponding service. In one embodiment, for example, the discovery engine filters on a concatenation of the service identifier and a user identification number included in the service discovery message, where the user identification number is associated with the service associated with the service identifier. In this manner, in an embodiment, the effective length of the service identifier is extended, thereby mitigating the risk of collisions.

Additionally or alternatively, in some embodiments, ambiguity is reduced by using multiple service identifiers, with a different identifier of the multiple service identifiers being used if a collision has been detected. In one such embodiment, a first service discovery message (e.g., request 50 and/or response 52 of FIG. 1) includes a first service identifier (e.g., first hash portion 156A of FIG. 3). In an embodiment, if a collision is detected by, or communicated to, the device sending the first service discovery message, the device sends a second service discovery request that includes a different, second service discovery message (e.g., the second hash portion 156B of FIG. 3).

In some embodiments, more than two service identifiers (e.g., hash portions) are available, so that at least two of the techniques described above may be utilized. In one embodiment, for example, the first device 12 includes the first hash portion 156A in service discovery request 50, and the second device 14 includes the second hash portion 156B in service discovery response 52. Thereafter, if a collision is nonetheless detected, the first device 12 includes a third hash portion (not shown in FIG. 3) in a second service discovery request, and/or the second device 14 includes a third or fourth hash portion (also not shown in FIG. 3) in a second service discovery response, in an embodiment. By combining both techniques, in some embodiments, it is possible to use an even shorter service identifier in each service discovery message.

Figure 4:
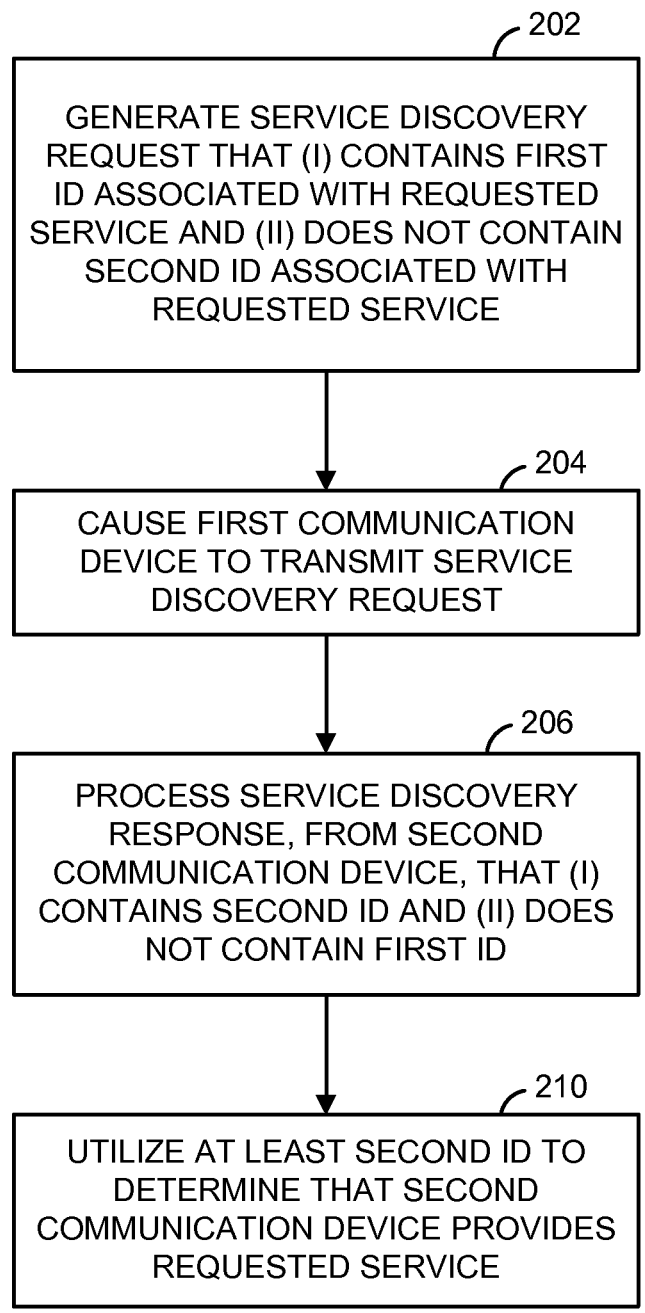
FIG. 4 is a flow diagram of an example method of performing service discovery from the perspective of a device requesting a service, with the request and response including different service identification information, according to an embodiment.

FIG. 4 is a flow diagram of an example method 200 of performing service discovery from the perspective of a device requesting a service, with the request and response including different service identification information, according to an embodiment. The method 200 is implemented in a first communication device. In one embodiment, for example, the method 200 is implemented in the first device 12 of FIG. 1. More specifically, in one embodiment, the method 200 is implemented by the Layer 3 processing unit 24 of the first device 12. In other embodiments, the method 200 is implemented in part by the Layer 3 processing unit 24, and in part by one or more other processing units of the first device 12 (e.g., WLAN processing unit 20, application processing unit 26, and/or one or more other processing units not shown in FIG. 1).

At block 202, a service discovery request is generated. The service discovery request contains a first identifier that is associated with a requested service. In various example embodiments and scenarios, the requested service is a printing service, a gaming service, a location-assistance service, a service for providing, playing or displaying media content, or any other suitable type of service. In some embodiments and/or scenarios, the requested service is a general service type, while in other embodiments and/or scenarios the requested service is a particular instance of a service (e.g., a printing service provided by a specific printer). In an embodiment, at least a second identifier is also associated with the requested service. The service discovery request generated at block 202, however, does not contain the second identifier. In an embodiment, at least a first table stored in the first communication device and a second table stored in the second communication device both include information indicating the association between the first identifier, the second identifier, and the requested service.

In an embodiment, the service discovery request is generated such that the first identifier is included in a predetermined service identifier field. In some embodiments, the service discovery request also includes, in one or more other fields, additional information relating to the requested service (e.g., a user identification number associated with the service, a request for service features, etc.).

In some embodiments, the first identifier includes a first portion of a hash, and the second identifier includes a different, second portion of the hash. In an embodiment, the hash is a hash of a string identifier associated with the requested service (such as a string identifier as utilized by Bonjour or DNLA, for example). In one embodiment, the hash includes at least 2n octets (e.g., 16 octets generated using a SHA-1 algorithm, 32 octets generated using a SHA-2 algorithm, etc.), the first portion of the hash consists of a first set of n octets of the hash, and the second portion of the hash consists of a second set of n octets of the hash, with the first and second sets of n octets being non-overlapping portions of the hash. In one such embodiment, n is equal to six. More generally, in some of these embodiments, n is an integer greater than or equal to six. In some embodiments, the first identifier and the second identifier are not necessarily the same length, but the combined length of both is at least 12 octets.

In some embodiments, the first identifier and the second identifier are equal to respective sequences of n consecutive octets of the hash (e.g., the first identifier consisting of octets [0:n−1] from the hash, and the second identifier consisting of octets [n:2n−1] of the hash, in an embodiment). In other embodiments, a more complex mapping algorithm is used to map and/or modify the hash to generate the first identifier and the second identifier.

At block 204, the first communication device is caused to transmit (e.g., broadcast) the service discovery request generated at block 202. In one embodiment in which the method 200 is implemented by the Layer 3 processing unit 24, for example, the service discovery request is caused to be transmitted by providing at least some of the content of the service discovery request, and/or an explicit transmit command, to the WLAN processing unit 20.

At block 206, a service discovery response is processed. In an embodiment, the service discovery response is received by the first communication device from a second communication device that had received the service discovery request (e.g., from the second device 14 of FIG. 1), and had determined that it could provide the requested service. The service discovery response contains the second identifier that was omitted from the service discovery request, but does not include the first identifier that was included in the service discovery request, in an embodiment. In some embodiments, there is no overlap between the service identification information in the service discovery request and the service discovery response. In other embodiments, however, some overlap does exist. In one embodiment, for example, the service discovery request generated at block 202 includes the first identifier as well as a third identifier (also associated with the requested service), and the service discovery response processed at block 206 includes the second identifier as well as the third identifier. In another example embodiment in which there is some overlap of service identification information, the first identifier and the second identifier include some (but not complete) overlap relative to each other (such as the first identifier consisting of octets [0:n+1] of a hash, and the second identifier consisting of octets [n−1:2n] of the hash, for example). Preferably, however, overlap is small or nonexistent in order to reduce overhead. In various embodiments, the service discovery response is processed at block 206 at least by parsing a service identifier field of the service discovery response.

At block 210, at least the second identifier is utilized to determine that the second communication device provides the requested service. In an embodiment, the determination at block 210 is made by using the second identifier as an index to a table associating service identifiers with corresponding services.

In some embodiments, the method 200 includes additional blocks not shown in FIG. 4. In one embodiment, for example, the method 200 includes an additional block, before block 202, in which the first identifier is determined. In one such embodiment, the first identifier is determined using information (e.g., a string identifier) received from an application that seeks or requires the service. In one embodiment, for example, the first identifier is determined using a same table that is used later (at block 210) to determine that the second communication device provides the requested service.

Figure 5:
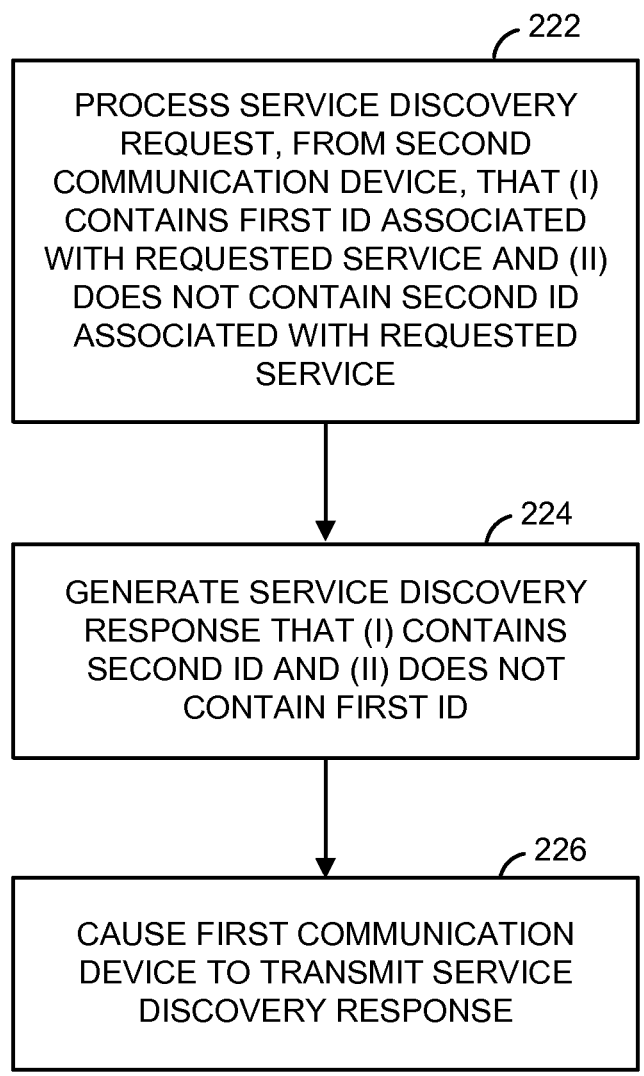
FIG. 5 is a flow diagram of an example method of performing service discovery from the perspective of a device providing a service, with the request and response including different service identification information, according to an embodiment.

FIG. 5 is a flow diagram of an example method 220 of performing service discovery from the perspective of a device providing a service, with the request and response including different service identification information, according to an embodiment. The method 220 is implemented in a first communication device. In one embodiment, for example, the method 220 is implemented in the second device 14 of FIG. 1. More specifically, in one embodiment, the method 220 is implemented by the Layer 3 processing unit 34 of the second device 14. In other embodiments, the method 220 is implemented in part by the Layer 3 processing unit 34, and in part by one or more other processing units of the second device 14 (e.g., WLAN processing unit 30, application processing unit 36, and/or one or more other processing units not shown in FIG. 1).

At block 222, a service discovery request is processed. In an embodiment, the service discovery request is a request that was received by the first communication device from a second communication device (e.g., from the first device 12 of FIG. 1). The service discovery request contains a first identifier that is associated with a requested service. In various example embodiments and scenarios, the requested service is a printing service, a gaming service, a location-assistance service, a service for providing, playing or displaying media content, or any other suitable type of service. In some embodiments and/or scenarios, the requested service is a general service type, while in other embodiments and/or scenarios the requested service is a particular instance of a service (e.g., a printing service provided by a specific printer). In an embodiment, at least a second identifier is also associated with the requested service. The service discovery request processed at block 222, however, does not contain the second identifier. In an embodiment, at least a first table stored in the first communication device and a second table stored in the second communication device both include information indicating the association between the first identifier, the second identifier, and the requested service.

After the service discovery request is processed at block 222, a service discovery response is generated at block 224. The service discovery response contains the second identifier that was omitted from the service discovery request, but does not contain the first identifier that was included in the service discovery request. In an embodiment, the service discovery response is generated such that the second identifier is included in a predetermined service identifier field. In some embodiments, the service discovery response also includes other information relating to the requested service (e.g., a user identification number associated with the service, a list of service features, etc.). As discussed above in connection with method 200 of FIG. 4, in various different embodiments there is, or is not, some amount of overlap between the service identification information included in the service discovery request and the service discovery response.

At block 226, the first communication device is caused to transmit the service discovery response generated at block 226. In one embodiment in which the method 220 is implemented by the Layer 3 processing unit 34, for example, the service discovery response is caused to be transmitted by providing at least some of the content of the service discovery response, and/or an explicit transmit command, to the WLAN processing unit 30.

In some embodiments, the method 220 includes additional blocks not shown in FIG. 5. In one embodiment, for example, the method 220 includes an additional block, between blocks 222 and 224, in which the second identifier is determined. In one such embodiment, the second identifier is determined using the first identifier that was included in the service discovery request. In one embodiment, for example, the first identifier is used as an index to a table in order to identify the requested service, and the second identifier is then determined by virtue of also being indexed to that same service.

Figure 6:
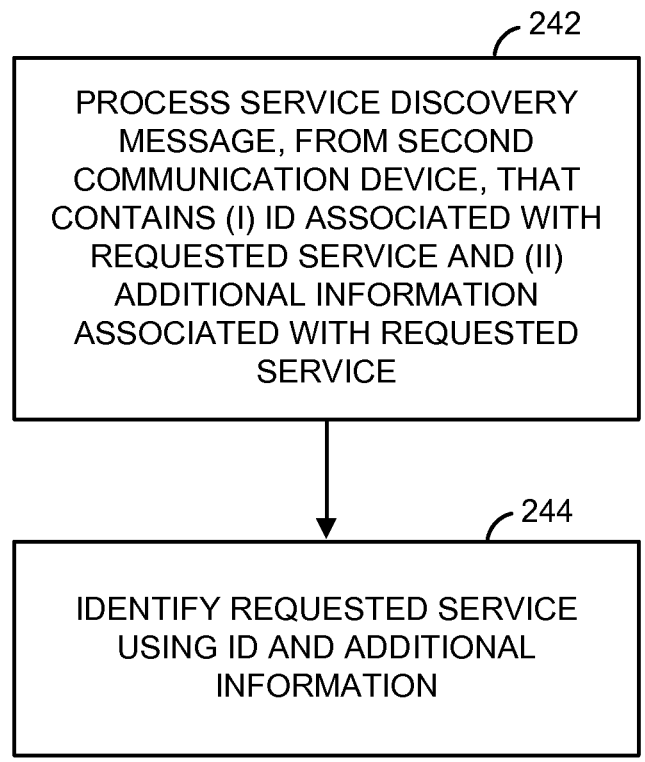
FIG. 6 is a flow diagram of an example method of performing service discovery using additional service information, according to an embodiment.

FIG. 6 is a flow diagram of an example method 240 of performing service discovery using additional service information, according to an embodiment. The method 240 is implemented in a first communication device. In various embodiments, for example, the method 240 is implemented in the first device 12 or the second device 14 of FIG. 1. More specifically, in one embodiment, the method 240 is implemented by a Layer 3 processing unit of the first communication device (e.g., Layer 3 processing unit 24 or Layer 3 processing unit 34 of FIG. 1). In other embodiments, the method 240 is implemented in part by a Layer 3 processing unit of the first communication device, and in part by one or more other processing units of the first communication device.

At block 242, a service discovery message is processed. In one embodiment, the service discovery message is a request that was received by the first communication device from a second communication device. In another embodiment, the service discovery message is a response that was received by the first communication device from a second communication device. The service discovery message contains an identifier that is associated with a requested service. In various example embodiments and scenarios, the requested service is a printing service, a gaming service, a location-assistance service, a service for providing, playing or displaying media content, or any other suitable type of service. In some embodiments and/or scenarios, the requested service is a general service type, while in other embodiments/scenarios the requested service is a particular instance of a service (e.g., a printing service provided by a specific printer).

In some embodiments, the identifier is a hash, or a portion of a hash (e.g., similar to any embodiment of the "first identifier" discussed above in connection with method 200 of FIG. 4). In other embodiments, the identifier is a different, suitable type of identifier. In addition to the identifier, the service discovery message includes other information associated with the requested service. In one embodiment, for example, the service discovery message also contains information (e.g., within one or more fields of the service discovery message) that is globally or locally unique to the requested service. In one such embodiment, the service discovery message includes a user identification number associated with the service. Additionally or alternatively, in some embodiments, the service discovery message contains additional information that is not necessarily unique to the requested service, but can help to distinguish the requested service from at least some other services. In one such embodiment and scenario, for example, the service discovery message includes a list of features/capabilities (e.g., for a display service, whether the service supports color display, 3D display, etc.). In various embodiments, the service discovery message is processed at block 242 at least by parsing a service identifier field and one or more additional fields of the service discovery message.

At block 244, the requested service is identified using both the identifier and the additional service-related information contained in the service discovery message. In one embodiment, for example, the requested service is identified by using a concatenation of the identifier and the additional information (e.g., a user identification number) as an index to a table in order to identify the corresponding service. As another example, in an embodiment, the requested service is identified by using the identifier as an index to a table in order to identify the corresponding service, and then, if a collision between two or more potential services is detected, using the additional information (e.g., a list of service capabilities) to "rule out" all but one of those services.

In some embodiments where the service discovery message processed at block 242 is a request, the identification of the service at block 244 results in a service discovery response being generated and transmitted to the second communication device. Alternatively, in some embodiments where the service discovery message processed at block 242 is a response, the identification of the service at block 244 results in an application of the first communication device proceeding to utilize the requested service, and/or displaying the requested service to a user.

Figure 7:
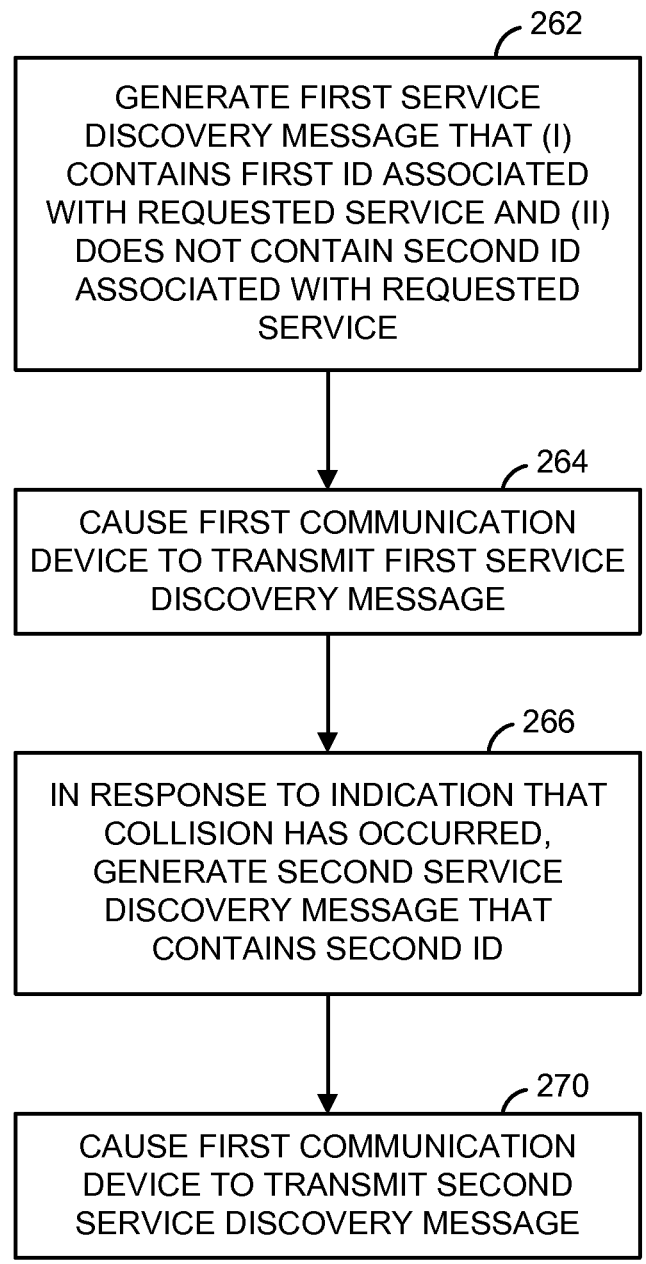
FIG. 7 is a flow diagram of an example method of performing service discovery using multiple service identifiers, according to an embodiment.

FIG. 7 is a flow diagram of an example method 260 of performing service discovery using multiple service identifiers, according to an embodiment. The method 260 is implemented in a first communication device. In various embodiments, for example, the method 260 is implemented in the first device 12 or the second device 14 of FIG. 1. More specifically, in one embodiment, the method 260 is implemented by a Layer 3 processing unit of the first communication device (e.g., Layer 3 processing unit 24 or Layer 3 processing unit 34 of FIG. 1). In other embodiments, the method 260 is implemented in part by a Layer 3 processing unit of the first communication device, and in part by one or more other processing units of the first communication device.

At block 262, a first service discovery message is generated. In one embodiment, the first service discovery message is a request that was received by the first communication device from a second communication device. In another embodiment, the first service discovery message is a response that was received by the first communication device from a second communication device. The first service discovery message contains a first identifier that is associated with a requested service. In various example embodiments and scenarios, the requested service is a printing service, a gaming service, a location-assistance service, a service for providing, playing or displaying media content, or any other suitable type of service. In some embodiments and/or scenarios, the requested service is a general service type, while in other embodiments/scenarios the requested service is a particular instance of a service (e.g., a printing service provided by a specific printer).

In an embodiment, at least a second identifier is also associated with the requested service. The service discovery message generated at block 262, however, does not contain the second identifier. In an embodiment, at least a first table stored in the first communication device and a second table stored in the second communication device both include information indicating the association between the first identifier, the second identifier, and the requested service. In some embodiments, each of the first and second identifiers is a hash, or a portion of a hash (e.g., similar to any embodiment of the "first identifier" and "second identifier" discussed above in connection with method 200 of FIG. 4). In other embodiments, the first identifier and/or second identifier are different, suitable types of identifiers.

At block 264, the first communication device is caused to transmit the first service discovery message. In one embodiment in which the method 260 is implemented by a Layer 3 processing unit, for example, the first service discovery message is caused to be transmitted by providing at least some of the content of the service discovery message, and/or an explicit transmit command, to a WLAN processing unit in the first communication device.

At block 266, in response to an indication that a collision has occurred, a second service discovery message is generated. The second service discovery message is of the same type as the first service discovery message (e.g., request or response), in an embodiment, and contains at least the second identifier associated with the requested service. In some embodiments, the second service discovery message also includes the first identifier. In other embodiments, the second service discovery message omits the first identifier. In an embodiment, the indication that a collision has occurred is generated within the first communication device. In other embodiments, the indication is generated in the second communication device, and is communicated to the first communication device prior to block 266. In one embodiment, it is determined that a collision has occurred if the first identifier is determined to be associated with (e.g., in a table within memory 28 or memory 38 of FIG. 1) at least two different services.

At block 270, the first communication device is caused to transmit the second service discovery message. Block 270 is similar to block 264, in an embodiment.

At least some of the various blocks, operations, and techniques described above may be implemented utilizing hardware, a processor executing firmware instructions, a processor executing software instructions, or any combination thereof. When implemented in hardware, the hardware may comprise one or more of discrete components, an integrated circuit, an ASIC, etc. When implemented utilizing a processor executing software or firmware instructions, the software or firmware instructions may be stored in any computer-readable memory such as on a magnetic disk, an optical disk, or other storage medium, in a RAM or ROM or flash memory, processor, hard disk drive, optical disk drive, tape drive, etc. Likewise, the software or firmware instructions may be delivered to a user or a system via any known or desired delivery method including, for example, on a computer-readable disk or other transportable computer storage mechanism or via communication media. Communication media typically embodies computer-readable instructions, data structures, program modules or other data in a modulated data signal such as a carrier wave or other transport mechanism. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, radio frequency, infrared and other wireless media. Thus, the software or firmware instructions may be delivered to a user or a system via a communication channel such as a telephone line, a DSL line, a cable television line, a fiber optics line, a wireless communication channel, the Internet, etc. (which are viewed as being the same as or interchangeable with providing such software via a transportable storage medium). The software or firmware instructions may include machine-readable instructions that, when executed by the processor, cause the processor to perform various acts.

While the present invention has been described with reference to specific examples, which are intended to be illustrative only and not to be limiting of the invention, changes, additions and/or deletions may be made to the disclosed embodiments without departing from the scope of the claims.

What is claimed is:

1. A method, implemented in a first communication device, of performing service discovery, the method comprising:
   generating, in the first communication device, a service discovery request that contains a first portion of an identifier, the identifier indicating a requested service, and wherein the service discovery request does not contain a second portion of the identifier indicating the requested service;
   causing the first communication device to transmit the service discovery request;
   processing, at the first communication device, a service discovery response received by the first communication device from a second communication device over a wireless communication network, wherein the service discovery response (i) contains the second portion of the identifier and (ii) does not contain the first portion of the identifier; and
   utilizing, by the first communication device, at least the second portion of the identifier to determine that the second communication device provides the requested service.

2. The method of claim 1, wherein:
   the first portion of the identifier includes a first portion of a hash; and
   the second portion of the identifier includes a second portion of the hash, wherein the second portion of the hash is different than the first portion of the hash.

3. The method of claim 2, wherein the hash is a hash of a string identifier associated with the requested service.

4. The method of claim 2, wherein:
the hash includes at least 2n octets;
the first portion of the identifier consists of a first set of n octets of the hash;
the second portion of the identifier consists of a second set of n octets of the hash; and
the first set of n octets and the second set of n octets are non-overlapping portions of the hash.

5. The method of claim 4, wherein n is greater than or equal to six.

6. The method of claim 1, wherein a length of the first portion of the identifier plus a length of the second portion of the identifier is greater than or equal to 12 octets.

7. A non-transitory, tangible, computer-readable memory storing instructions that, when executed by one or more processors in a first communication device, cause the one or more processors to:
generate a service discovery request that contains a first portion of an identifier, the identifier indicating a requested service, and wherein the service discovery request does not contain a second portion of the identifier indicating the requested service;
cause the first communication device to transmit the service discovery request;
process a service discovery response received by the first communication device from a second communication device over a wireless communication network, wherein the service discovery response (i) contains the second portion of the identifier and (ii) does not contain the first portion of the identifier; and
utilize at least the second portion of the identifier to determine that the second communication device provides the requested service.

8. The non-transitory, tangible, computer-readable memory of claim 7, wherein:
the first portion of the identifier includes a first portion of a hash; and
the second portion of the identifier includes a second portion of the hash, wherein the second portion of the hash is different than the first portion of the hash.

9. The non-transitory, tangible, computer-readable memory of claim 8, wherein the hash is a hash of a string identifier associated with the requested service.

10. The non-transitory, tangible, computer-readable memory of claim 8, wherein:
the hash includes at least 2n octets;
the first portion of the identifier consists of a first set of n octets of the hash;
the second portion of the identifier consists of a second set of n octets of the hash; and
the first set of n octets and the second set of n octets are non-overlapping portions of the hash.

11. The non-transitory, tangible, computer-readable memory of claim 10, wherein n is greater than or equal to six.

12. The non-transitory, tangible, computer-readable memory of claim 7, wherein a length of the first portion of the identifier plus a length of the second portion of the identifier is greater than or equal to 12 octets.

13. A method, implemented in a first communication device, of performing service discovery, the method comprising:
processing, at the first communication device, a service discovery request received by the first communication device from a second communication device over a wireless communication network, wherein the service discovery request that contains a first portion of an identifier, the identifier indicating a requested service, and wherein the service discovery request does not contain a second portion of the identifier indicating the requested service; and
after processing the service discovery request, generating, at the first communication device, a service discovery response that (i) contains the second portion of the identifier and (ii) does not contain the first portion of the identifier; and
causing the first communication device to transmit the service discovery response to the second communication over a wireless communication network so that the second communication device can utilize at least the second portion of the identifier to determine that the first communication device provides the requested service.

14. The method of claim 13, wherein:
the first portion of the identifier includes a first portion of a hash; and
the second portion of the identifier includes a second portion of the hash, wherein the second portion of the hash is different than the first portion of the hash.

15. The method of claim 14, wherein the hash is a hash of a string identifier associated with the requested service.

16. The method of claim 14, wherein:
the hash includes at least 2n octets;
the first portion of the identifier consists of a first set of n octets of the hash;
the second portion of the identifier consists of a second set of n octets of the hash; and
the first set of n octets and the second set of n octets are non-overlapping portions of the hash.

17. The method of claim 16, wherein n is greater than or equal to six.

18. A non-transitory, tangible, computer-readable memory storing instructions that, when executed by one or more processors in a first communication device, cause the one or more processors to:
process, at the first communication device, a service discovery request received by the first communication device from a second communication device over a wireless communication network, wherein the service discovery request contains a first portion of an identifier, the identifier indicating a requested service, and wherein the service discovery request does not contain a second portion of the identifier indicating the requested service; and
cause the first communication device to transmit the service discovery response to the second communication over a wireless communication network so that the second communication device can utilize at least the second portion of the identifier to determine that the first communication device provides the requested service.

19. The non-transitory, tangible, computer-readable memory of claim 18, wherein:
the first portion of the identifier includes a first portion of a hash; and
the second portion of the identifier includes a second portion of the hash, wherein the second portion of the hash is different than the first portion of the hash.

20. The non-transitory, tangible, computer-readable memory of claim 19, wherein the hash is a hash of a string identifier associated with the requested service.

* * * * *